No. 889,755. PATENTED JUNE 2, 1908.
J. J. BROWN.
NUT LOCK.
APPLICATION FILED SEPT. 13, 1907.
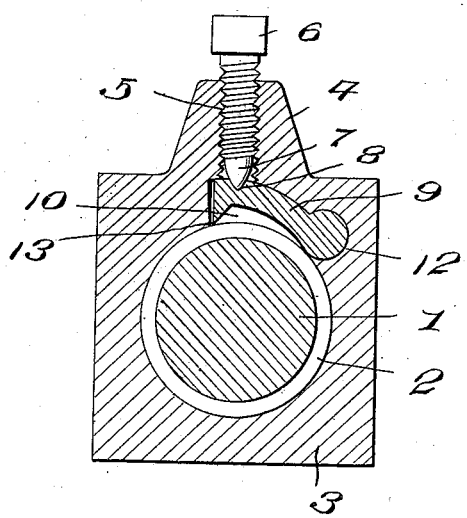
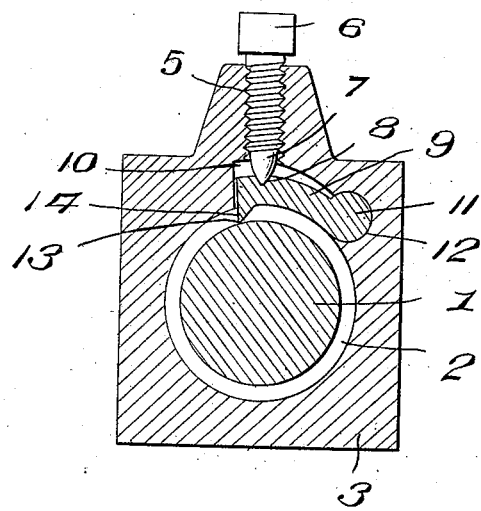
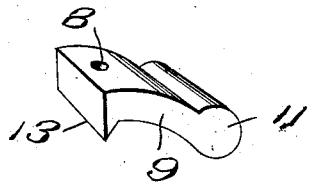
WITNESSES:
INVENTOR
J. J. Brown
BY
Attorneys

UNITED STATES PATENT OFFICE.

JOHN J. BROWN, OF BASTROP, LOUISIANA, ASSIGNOR OF ONE-HALF TO H. J. BRODNAX, OF MONROE, LOUISIANA.

NUT-LOCK.

No. 889,755.     Specification of Letters Patent.     Patented June 2, 1908.

Application filed September 13, 1907. Serial No. 392,787.

*To all whom it may concern:*

Be it known that I, JOHN J. BROWN, a citizen of the United States, residing at Bastrop, in the parish of Morehouse and State of Louisiana, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks, and my object is to provide means for securing a nut in its adjusted position on a bolt.

A further object is to provide means for directing a locking dog into engagement with the threads on the bolt.

Other objects and advantages will be hereinafter referred to and more particularly pointed out in the claim.

In the accompanying drawings which are made a part of this application, Figure 1 is a sectional view, showing my improved locking mechanism in position to be applied to use. Fig. 2 is a similar view, showing the locking device applied to use, and, Fig. 3 is a perspective view of the locking dog removed from the nut.

Referring to the drawings in which similar reference numerals designate corresponding parts throughout the several views, 1 indicates a bolt, which may be of the usual, or any preferred form, one end of which is provided with a plurality of threads 2, and 3 indicates my improved form of nut, which is interiorly threaded and adapted to coöperate with the threaded end of the bolt 1.

Formed on one edge of the nut 3, is an extension 4, having a threaded bore 5 extending therethrough, in which is adapted to be seated a locking bolt 6, the lower end 7 of which is pointed and adapted to enter a recess 8 in the upper face of a locking dog 9.

That portion of the nut immediately below the lower end of the bore 5 is provided with a cavity 10, which extends laterally the full width of the nut, in which the locking dog is seated, one end of said locking dog being provided with a circular head 11, which is adapted to enter a socket 12 at one end of the cavity while the opposite end of the locking dog is provided with a depending tooth 13, whereby, when the free end of the locking dog is depressed, the tooth 13 will be forced into the threads 2 on the bolt, and, thereby, lock the nut on the bolt.

The cavity 10 is of such dimensions that the locking dog and tooth thereon will readily pass over the threads on the bolt when the nut is being applied thereto, and when the nut has been turned to the proper position on the bolt, the locking bolt 6 is directed inwardly against the free end of the locking dog, thereby forcing the tooth into engagement with the threads on the bolt, said tooth displacing the threads at the point of engagement and forming a channel 14, in which the tooth rests and by entering the pointed end 7 of the locking bolt in the recess 8, the locking dog 9 is prevented from moving out of the cavity in the nut and it will further be seen that the locking dog may be entirely removed from the nut, until the nut is turned home on the bolt, after which the locking dog may be entered lengthwise into the cavity 10 and locked in position on the bolt, as before described.

It will thus be seen that I have provided a very cheap and efficient form of locking device for nuts, and one that can be employed in connection with any make of bolt having threads at one end thereof. It will further be seen that if desired, the nut may be used without employing the locking features in connection therewith, the locking dog and bolt being so arranged that they may be readily removed from the nut, if desired.

What I claim is:

A nut lock comprising the combination with a threaded bolt having the threads thereof uninterrupted; of a nut adapted to take on said bolt, said nut having a cavity extending laterally therethrough the entire width thereof communicating with the bore thereof, a dog having one end pivotally mounted within the cavity and having a depending edged tooth at its opposite end at right angles thereto, a hollow extension arranged on one edge of the nut, the bore of the extension communicating with the cavity above the pawl therein, said bore being threaded, and a bolt threaded within said bore contacting with the pawl adjacent the depending tooth for causing the edged tooth of the pawl to bite the threads of the bolt.

In testimony whereof I have signed my name to this specification in the presence of two subscribing witnesses.

JOHN J. BROWN.

Witnesses:
R. B. WASHBURN,
J. T. SEVGIN.